United States Patent
Gupté

[19]

[11] Patent Number: 6,036,896
[45] Date of Patent: Mar. 14, 2000

[54] METHOD FOR PREHEATING PERMEABLE, THERMOFORMABLE MATERIAL

[75] Inventor: Sunil K. Gupté, Livonia, Mich.

[73] Assignee: Lear Corporation, Southfield, Mich.

[21] Appl. No.: 09/082,743

[22] Filed: May 21, 1998

[51] Int. Cl.[7] .................................................. B29C 35/04
[52] U.S. Cl. ...................... 264/37.17; 264/322; 264/345; 432/29
[58] Field of Search ................................... 264/510, 511, 264/512, 522, 546, 345, 322, 324, 37.17; 432/29, 179, 194, 196, 197, 201, 205

[56] References Cited

U.S. PATENT DOCUMENTS

| | | |
|---|---|---|
| 3,891,738 | 6/1975 | Shen . |
| 4,115,498 | 9/1978 | Kissell et al. . |
| 4,321,758 | 3/1982 | Fowler . |
| 4,379,101 | 4/1983 | Smith . |
| 4,504,341 | 3/1985 | Radzwill et al. . |
| 4,515,561 | 5/1985 | Melgaard . |
| 4,609,519 | 9/1986 | Pichard et al. ........................ 264/510 |
| 4,649,014 | 3/1987 | Tochikawa . |
| 4,692,199 | 9/1987 | Kozlowski et al. . |
| 4,812,284 | 3/1989 | Fleissner . |
| 4,921,561 | 5/1990 | Kinugasa et al. . |
| 4,923,555 | 5/1990 | Elliott et al. . |
| 4,943,222 | 7/1990 | Nathoo ..................................... 425/89 |
| 5,035,031 | 7/1991 | Elliott . |
| 5,052,197 | 10/1991 | Fleissner . |
| 5,080,749 | 1/1992 | Moriya et al. . |
| 5,085,580 | 2/1992 | Reunamaki .............................. 432/59 |
| 5,108,532 | 4/1992 | Thein et al. ............................ 156/285 |
| 5,108,691 | 4/1992 | Elliott . |
| 5,185,940 | 2/1993 | Fleissner . |
| 5,554,252 | 9/1996 | Foran . |
| 5,570,594 | 11/1996 | Fleissner . |
| 5,575,080 | 11/1996 | Fleissner . |
| 5,578,158 | 11/1996 | Gutowski et al. . |
| 5,609,046 | 3/1997 | Fleissner . |
| 5,679,197 | 10/1997 | Haupt et al. . |

FOREIGN PATENT DOCUMENTS

| | | |
|---|---|---|
| 0 148 762 | 7/1985 | European Pat. Off. . |
| 1 538 811 | 8/1967 | France . |
| 36 25 818 A1 | 2/1988 | Germany . |
| 195 41 524 C1 | 2/1997 | Germany . |

OTHER PUBLICATIONS

Sunil K. Gupte et al., "Role of micro–convention due to non–affine motion of particles in a mono–disperse suspension", 7284 Elsevier HMT MS 736, Jun. 1995, vol. 00, No. 0, pp. 1–14.

Sunil K. Gupte, "Modeling And Experimental Investigation Of Transport Processes During The Flow Of Viscous Fluids In Porous Materials", A dissertation submitted to the Faculty of the University of Michigan, May 1995.

Derwent Abstract corresponding to DE 195 41 524 C1.
Derwent Abstract corresponding to FR 1 538 811.
Derwent Abstract corresponding to DE 36 25 818 A1.

*Primary Examiner*—Jan H. Silbaugh
*Assistant Examiner*—Dae Young Lee
*Attorney, Agent, or Firm*—Brooks & Kushman PC

[57] ABSTRACT

A method of preheating a thermoformable laminate assembly having first and second sides is disclosed. The method includes supplying pressurized heated air to first and second manifolds, each of which has an inlet for receiving the heated air and a plurality of orifices for passing the heated air out of the respective manifold. The manifolds are configured such that the orifices disposed progressively further away from the inlet of one manifold correspond with the orifices disposed progressively nearer to the inlet of the other manifold. The method further includes homogenizing the heated air and introducing the heated air onto the first side of the laminate assembly. A suction is developed on the second side of the laminate assembly to draw the heated air through the assembly, thereby convectively heating the assembly. An apparatus for practicing the method is also disclosed.

24 Claims, 2 Drawing Sheets

METHOD FOR PREHEATING PERMEABLE, THERMOFORMABLE MATERIAL

TECHNICAL FIELD

This invention relates to a method and apparatus for preheating a permeable, thermoformable material using convective heating.

BACKGROUND ART

A prior method of preheating a thermoformable material, including thermoset and thermoplastic materials, involves contact heating. The contact heating method includes placing the material in direct contact with a heat source, such as thermally regulated upper and lower platens. Heat is then transferred principally by conduction from the outer surface to the inner core of the material. Because such materials are typically poor conductors of heat, however, this method requires a significant amount of time to sufficiently heat the materials.

Another method of preheating a thermoformable material involves radiant heating. This method involves placing the material near a radiant heat source, such as electric coils or ceramic heaters. The outer portions of the material, however, tend to selectively absorb the radiant energy, and core heating is again accomplished primarily by conduction. Consequently, this method also requires a significant amount of time to sufficiently heat the material.

SUMMARY OF THE INVENTION

The above identified shortcomings are overcome by the present invention, which is a method and apparatus for preheating a permeable, thermoformable material using convective heating. The method comprises supplying heated fluid to a fluid distribution system and homogenizing the heated fluid. The method further includes introducing the heated fluid adjacent the thermoformable material, and drawing the heated fluid through the material to convectively heat the material.

The apparatus for preheating a thermoformable material having first and second sides comprises a housing and first and second retaining members cooperable with each other to sufficiently retain the material within the housing. A fluid distribution system is disposed within the housing and is adapted to be connected to a source of heated fluid. The fluid distribution system is operative to introduce heated fluid onto the first side of the material. In addition, the housing is adapted to cooperate with a negative pressure source for developing a suction on the second side of the material to draw the heated fluid through the material, thereby convectively heating the material.

Accordingly, it is an object of the invention to provide a method for efficiently preheating a thermoformable material using convective heat transfer.

It is another object of the invention to provide a method of the type described above which involves developing a suction to draw heated air through the material.

It is still another object of the invention to provide an apparatus of the type described above for convectively heating the material.

These and other objects, features, and advantages of the present invention are readily apparent from the following detailed description of the best mode for carrying out the invention when taken in conjunction with the accompanying drawings.

BEST MODES FOR CARRYING OUT THE INVENTION

Figure 1:
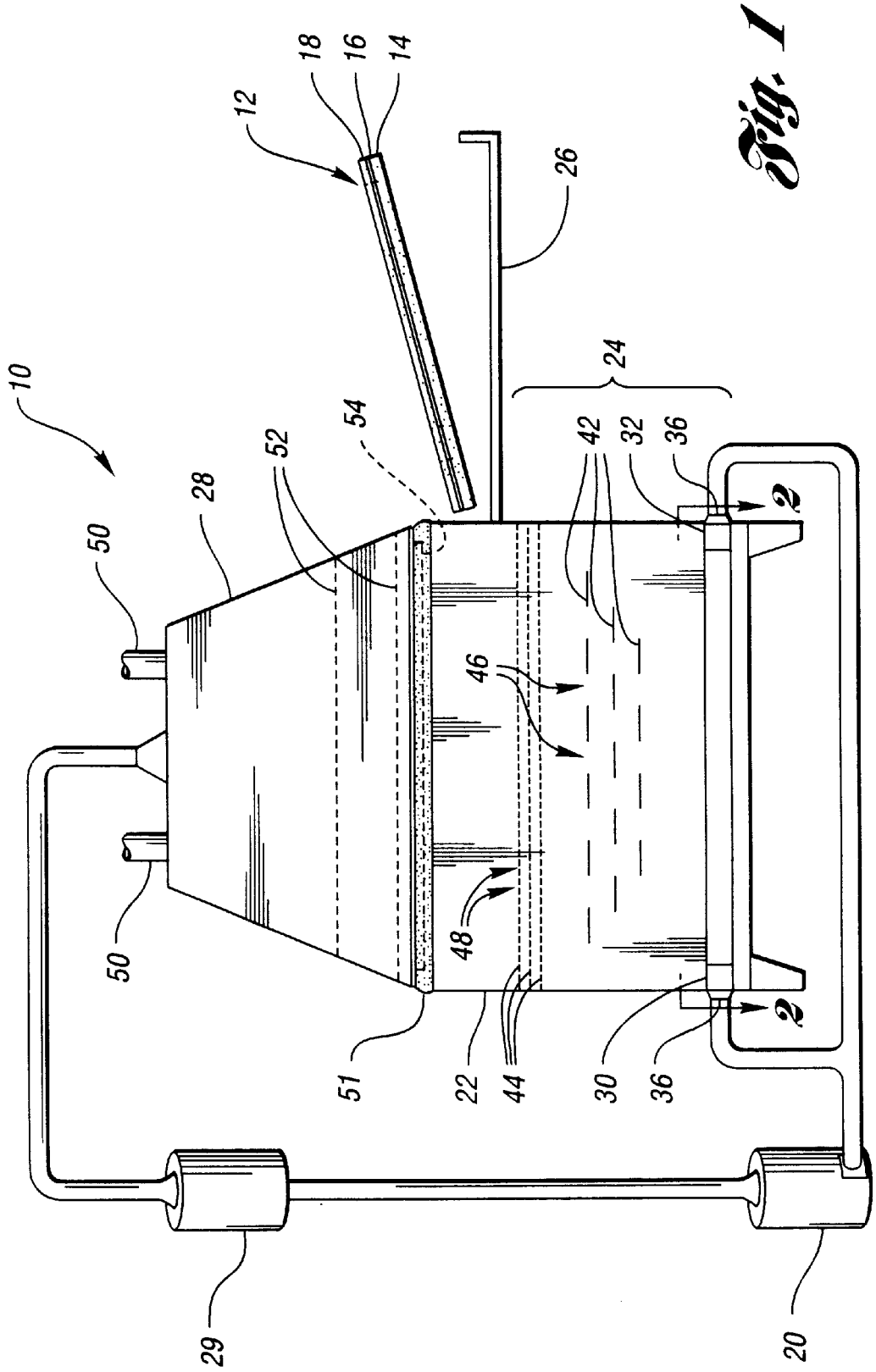
FIG. 1 is a schematic diagram of an apparatus according to the invention and showing a vertically moveable vacuum hood, a laterally moveable support member and a fluid distribution system having a pair of hot air manifolds.

With reference to the drawings, the preferred embodiments of the invention will be described. FIG. 1 shows an apparatus 10 according to the invention for preheating permeable, thermoformable materials such as a laminate assembly 12, which includes a formable layer 14, an adhesive layer 16 and a cover member 18. The apparatus 10 preferably comprises a source of heated fluid such as a hot air source 20, an insulated housing 22, a fluid distribution system 24, a first retaining member or support member 26, a vacuum hood 28, and a vacuum source 29. Alternatively, the source of heated fluid may be a steam source or any other suitable source of heated fluid.

Figure 2:
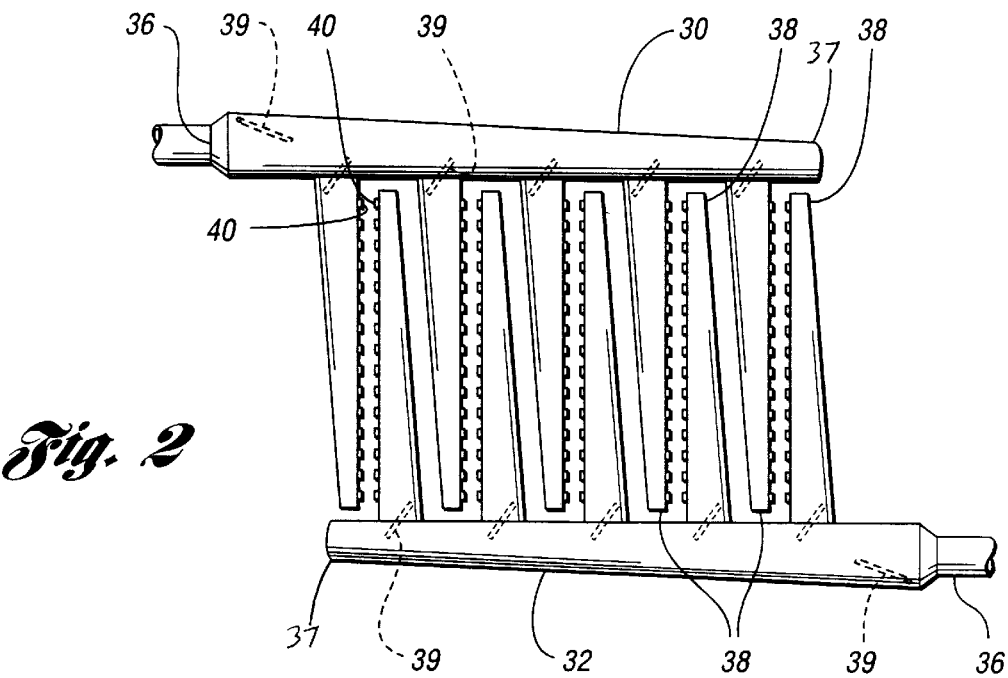
FIG. 2 is a schematically arranged top view of the hot air manifolds.

The fluid distribution system 24 is disposed within the housing 22 and preferably comprises a pair of hot-air manifolds 30 and 32 as shown in FIGS. 1 and 2. Each of the manifolds 30 and 32 has an inlet 36 connected to the hot air source 20, a main trunk 37, a plurality of legs 38 extending from the trunk 37, and a plurality of dampers 39 for regulating air flow through the trunk and legs. Each of the legs 38 has a plurality of orifices 40 for distributing hot air from the manifolds 30 and 32. The manifolds 30 and 32 are preferably symmetrical, and are arranged such that the inlets 36 are disposed on opposite sides of the housing 22. Air temperature, pressure and mass flow rate at both inlets 36 are preferably substantially identical. With this configuration, the orifices 40 disposed progressively further away from the inlet 36 of one of the manifolds 30 and 32 are juxtaposed or otherwise correspond with the orifices 40 disposed progressively nearer to the inlet 36 of the other manifold. Consequently, relatively cooler and slower moving air exiting furthest away from the inlet 36 of one of the manifolds 30 and 32 mixes with relatively hotter and faster moving air exiting nearest the inlet 36 of the other manifold, thereby homogenizing the heated air mixture.

Alternatively, heated air may be distributed in a different manner from the manifolds 30 and 32 simply by adjusting the dampers 39 to create a different effective configuration of the manifolds. For example, by closing the dampers 39 in the innermost legs 38, while leaving the dampers in the outermost legs open, heated air can be distributed along opposing side walls of the housing 22. The main trunks 37 may also be provided with orifices (not shown) so that air can be distributed along all four side walls of the housing 22. Furthermore, the manifolds 30 and 32 may be eliminated if the heated air supplied to the housing 22 is sufficiently homogenized by other means, such as by extending the housing to allow additional mixing of the air to occur, or if non-homogenized air is required for a particular application.

As shown in FIG. 1, the fluid distribution system 24 also preferably comprises a plurality of flow regulating devices such as baffles 42 and meshes 44 for regulating flow of the heated air mixture. Each of the baffles 42 has a plurality of perforations 46, and the perforations of adjacent baffles are preferably offset with respect to each other to induce additional mixing of the heated air mixture. This additional mixing action further homogenizes the heated air mixture by reducing temperature and velocity variations throughout the mixture. Similarly, each of the meshes 44 has a plurality of fine openings 48, and the fine openings of adjacent meshes are preferably offset with respect to each other to still further homogenize the heated air mixture.

Alternatively, the fluid distribution system 24 may be provided without any baffles 42 or meshes 44 if the heated air is otherwise sufficiently homogenized prior to contacting the laminate assembly 12, or if non-homogenized air is required for a particular application. Furthermore, the baffles 42 and/or meshes 44 may be configured to selectively homogenize at least a portion of the heated air mixture. The manifolds 30 and 32, the baffles 42 and the meshes 44 are all preferably removably mounted within the housing, such as on sliding trays, so that each of the components can be modified, eliminated or replaced with another component depending on the application.

Figure 3:
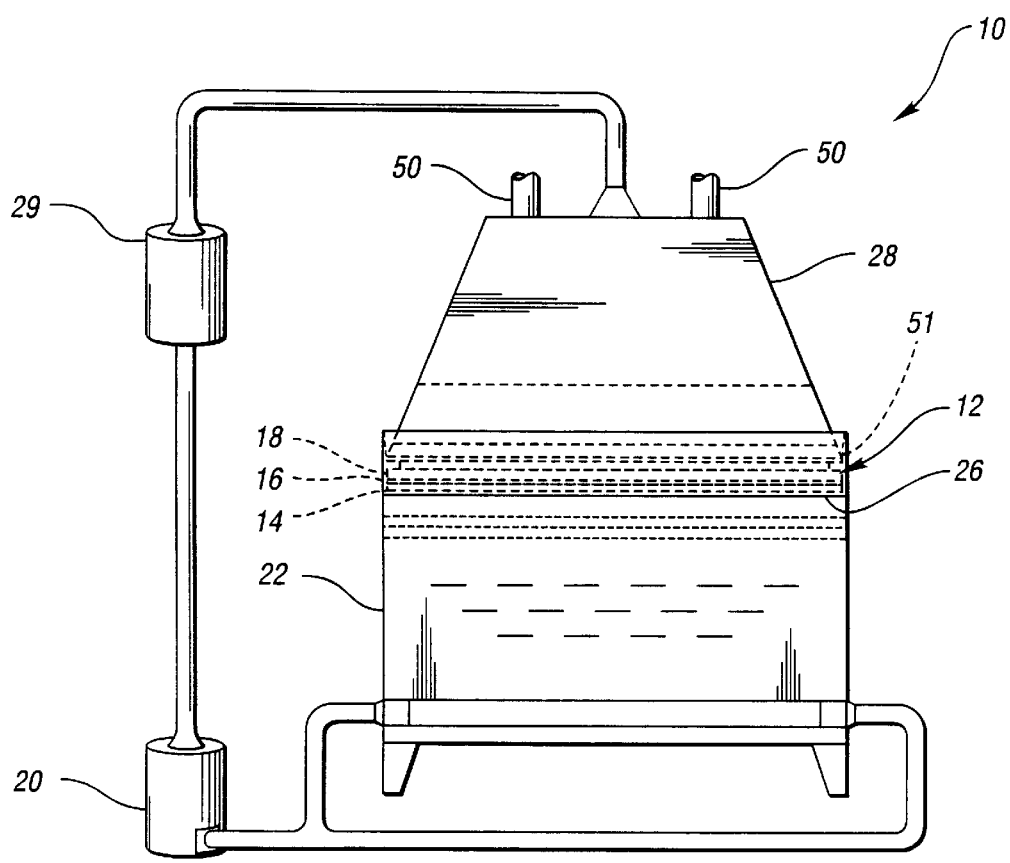
FIG. 3 is a schematic diagram of the apparatus of FIG. 1 with the vacuum hood and support member in their respective closed positions for retaining the laminate assembly therebetween.

The first retaining member or support member 26 is laterally moveable with respect to the housing 22 between an open position for receiving the laminate assembly 12 as shown in FIG. 1, and a closed position for retaining the laminate assembly within the housing as shown in FIG. 3. The support member 26 may be a permeable screen or other suitable device which is configured to sufficiently support the laminate assembly 12 within the housing 22. Alternatively, the first retaining member may be an endless conveyor configured to receive and support a continuous laminate assembly from, for example, rolled stock. In either case, the first retaining member is preferably configured so as to optimize air flow permeability and strength, while minimizing resistance to air flow and associated micro-scale flow disturbances.

The vacuum hood 28 is preferably connected to a pair of cylinders 50 for automatically moving the hood vertically with respect to the housing 22 between an open position as shown in FIG. 1, and a closed position for retaining the laminate assembly 12 between the hood and the support member 26 as shown in FIG. 3. A flexible seal 51 is preferably disposed between the hood 28 and the housing 22 for minimizing heat loss as the hood is opened and closed. Alternatively, the vacuum hood 28 may be connected to any other suitable arrangement for automatically or manually moving the hood, or the hood may be free standing. A plurality of flow regulating devices or meshes 52 are disposed within the hood 28, and are configured to maintain the homogeneity of the heated air as it exits from the laminate assembly 12. A second retaining member such as a rigid screen 54 is connected to the vacuum hood 28, and is configured to sufficiently retain and support the laminate assembly 12 during the preheating process. The rigid screen 54 is preferably configured so as to optimize air flow permeability and strength, while minimizing resistance to air flow and associated micro-scale flow disturbances. Alternatively, the rigid screen 54 may be configured to function as a flow regulating device. Although the second retaining member is preferably provided as part of the vacuum hood 28, it may be provided as a separate component.

The vacuum source 29 is connected to the vacuum hood 28, and is adapted to reduce the pressure within the hood relative to the pressure surrounding the manifolds 30 and 32. The vacuum source 29 preferably achieves a gauge pressure within the hood in the range of 0 to −5 pounds per square inch (psi), while the gauge pressure of the heated air exiting the manifolds 30 and 32 is preferably in the range of 0 to 5 psi. As a result, a pressure gradient of 0 to 10 psi is developed across the laminate assembly 12 for drawing the heated air mixture through the assembly.

The method according to the invention involves positioning the laminate assembly 12 on the support member 26 when the support member and the vacuum hood 28 are in their respective opened positions as shown in FIG. 1. The formable layer 14 of the laminate assembly 12 may be any permeable material which is thermoformable when sufficiently heated. Such materials include thermoformable rigid urethane (TRU) and polyethylene terephthalate (PET), with fibrous, non-woven PET being the preferred material for headliner applications. The adhesive layer 16 may comprise any permeable thermosetting or thermoplastic adhesive. The cover member 18 preferably comprises non-woven PET for headliner applications, but it may comprise any suitable permeable cover material such as cloth or carpet. Alternatively, the cover member 18 and/or the adhesive layer 16 may be eliminated if not required for a particular application. Furthermore, multiple formable layers 14 and/or adhesive layers 16 may be utilized depending on the application.

As shown in FIG. 3, the support member 26 is then moved to its closed position such that the support member and the laminate assembly 12 are contained within the housing 22. Next, the vacuum hood 28 is automatically or otherwise moved to its closed position to effect a sealed relationship between the hood and the housing 22, and to sufficiently retain the laminate assembly 12 between the rigid screen 54 and the support member 26.

Pressurized heated air having a temperature in the range of ambient air to 300° C. is then introduced into the manifolds 30 and 32 through the inlets 36. The dampers 39 may be adjusted to regulate flow of the heated air through the legs 38. Air exiting adjacent legs 38 is mixed together to create the homogenous heated air mixture. The heated air mixture is then further homogenized by the baffles 42 and the screens 46 to reduce velocity and temperature variations. After sufficient homogenization has occurred, the heated air mixture preferably has a substantially uniform velocity and a substantially uniform temperature.

The vacuum source 29 is activated simultaneously with the introduction of heated air into the manifolds 30 and 32 to reduce the pressure within the hood 28. As a result, a pressure gradient is developed across the laminate assembly 12 for drawing the heated air mixture through the assembly as previously explained. In practice, it has been determined that for a laminate assembly comprising three PET formable layers 14, an adhesive layer 16 and a PET cover member 18, a pressure gradient of 0.5 pounds per square inch per inch is adequate to achieve a sufficient heated air mixture flow rate through the laminate assembly.

As the heated air mixture passes through the laminate assembly 12, the air mixture passes from a relatively high energy state to a lower energy state, while transferring thermal energy to the laminate assembly by convective heat transfer. The energy state of the air mixture at a particular point is determined by kinetic, potential and internal energies of the air mixture taken together. Various terms used to describe and loosely quantify these energies include, but are not limited to, static pressure, vacuum suction, high/low impingement velocity air, and high/low temperature air. Any suitable combination of these energies and/or terms may be engineered in accordance with the invention to achieve a particular upstream to downstream negative energy gradient necessary to induce sufficient air flow through and heat transfer to the laminate assembly 12. Consequently, the laminate assembly 12 can be heated effectively and efficiently by this method. Alternatively, the homogenization process described above may be eliminated or selectively applied in order to differentially heat the laminate assembly 12. Furthermore, the heated air mixture may be mixed with an atomized or sprayed chemical catalyst, such as water, to facilitate or improve processing of the laminate assembly 12, such as by increasing the chemical reaction and cross-linking of polymers within the laminate assembly.

Screens 52 preferably maintain the homogeneity of the air mixture as it exits the laminate assembly 12 in order to ensure optimum air flow throughout the entire assembly. Furthermore, air exiting from the hood 28 is preferably recirculated back to the hot air source 20 so that it may be reused. Once sufficiently heated, the laminate assembly 12 may then be thermoformed in any suitable manner, such as by positioning the assembly between mold halves and forcing the mold halves together to form a part, such as a headliner, floor carpet system, or package tray.

Under this method, heating times can be significantly reduced as compared with prior art heating methods. In one exemplary case, the heating time for a laminate assembly was reduced from 300 seconds with conventional radiant heating, to less than 30 seconds utilizing the method according to the invention. This method is also particularly well suited for lofted fibrous materials which tend to be poor conductors of heat, but which readily allow air flow therethrough. Because of the large cumulative surface area of the fibers which is exposed to the air flow, microscopic convection is maximized. In addition, the fibers act as inclusions which cause additional movement or turbulence of the air around individual fibers and/or clusters of fibers. Such air movement further induces micro-convection.

Furthermore, because the manifolds 30 and 32 preferably function to create a homogenous heated air mixture, the apparatus 10 can be made relatively compact. This is possible because additional space in the housing 22 is not required to allow additional mixing of the air to occur.

The invention has been described in an illustrative manner, and it is to be understood that the terminology which has been used is intended to be in the nature of words of description rather than of limitation. Obviously, many modifications and variations of the invention are possible in light of the above teachings. For example, convective heating can be used in conjunction with other heating methods such as contact heating, radiant heating, and microwave heating. It is, therefore, to be understood that within the scope of the appended claims, the invention may be practiced otherwise than as specifically claimed.

What is claimed is:

1. A method of preheating a permeable, thermoformable material, the method comprising:
   supplying heated fluid to a fluid distribution system;
   homogenizing the heated fluid such that the heated fluid has a substantially uniform velocity and temperature;
   introducing the heated fluid adjacent the material;
   drawing the heated fluid through the material to convectively heat the material; and
   passing the heated fluid through a flow regulating device after the heated fluid has been drawn through the material to maintain the homogeneity of the heated fluid as the heated fluid exits the material.

2. The method of claim 1 wherein the material comprises at least one layer of non-woven thermoplastic fibers.

3. The method of claim 2 wherein the material further comprises a cover member and an adhesive layer sandwiched between the cover member and the at least one layer of non-woven thermoplastic fibers.

4. The method of claim 1 wherein homogenizing the heated fluid comprises passing the heated fluid through multiple baffles and multiple meshes, each of the baffles having a plurality of perforations, each of the meshes having a plurality of openings, wherein the perforations of adjacent baffles are offset with respect to each other, and wherein the openings of adjacent meshes are offset with respect to each other.

5. The method of claim 4 wherein the fluid regulating device includes multiple meshes, each of the meshes having a plurality of openings, wherein the openings of adjacent meshes are offset with respect to each other.

6. The method of claim 1 further comprising mixing the heated fluid with an atomized catalyst prior to drawing the heated fluid through the material.

7. The method of claim 6 wherein the catalyst comprises water.

8. The method of claim 1 wherein the fluid comprises air.

9. The method of claim 1 wherein the heated fluid introduced adjacent the material is pressurized.

10. The method of claim 1 wherein homogenizing the heated fluid comprises passing the heated fluid through at least one baffle.

11. The method of claim 1 wherein homogenizing the heated fluid comprises passing the heated fluid through at least one mesh.

12. The method of claim 1 wherein homogenizing the heated fluid comprises passing the heated fluid through at least one baffle and at least one mesh.

13. The method of claim 1 wherein the fluid regulating device includes at least one mesh.

14. The method of claim 1 wherein drawing the heated fluid through the material comprises creating a pressure gradient of less than 10 pounds per square inch across the material.

15. A method of preheating a permeable, thermoformable laminate assembly for a subsequent forming operation, the laminate assembly having first and second sides and including a cover member, at least one formable layer and an adhesive layer sandwiched between the cover member and the at least one formable layer, the method comprising:
   positioning the laminate assembly between first and second permeable retaining members:
   supplying pressurized heated air to first and second manifolds, each of the manifolds having an inlet for receiving the heated air and a plurality of outlet orifices for passing the heated air out of the respective manifold, the manifolds being configured such that the outlet orifices of each manifold are respectively disposed progressively remote from the inlet of the respective manifold so that a respectively more remote orifice of one manifold opposes respectively a less remote orifice of the other manifold for mixing the heated air passing out of the manifolds;
   passing the heated air through a first flow regulating device to homogenize the heated air such that the heated air has a substantially uniform temperature and velocity, wherein the first flow regulating device is spaced from the retaining members;
   introducing the heated air onto the first side of the laminate assembly;
   developing a suction on the second side of the laminate assembly sufficient to draw the heated air through the laminate assembly, thereby convectively heating the laminate assembly; and passing the heated air through a second flow regulating device after the heated air has been drawn through the laminate assembly to maintain the homogeneity of the heated air as the heated air exits the laminate assembly.

16. The method of claim 15 further comprising mixing the heated air with an atomized catalyst prior to introducing the heated air onto the first side of the laminate assembly.

17. The method of claim 16 wherein the catalyst comprises water.

18. The method of claim 15 wherein the second flow regulating device comprises the second retaining member.

19. The method of claim 15 further comprising recirculating at least a portion of the heated air back to the first and second manifolds.

20. A method of preheating a permeable, thermoformable material for a subsequent forming operation, the method comprising:

supplying pressurized heated air to a fluid distribution system;

homogenizing the heated air such that the heated air has a substantially uniform velocity and temperature;

mixing the heated air with an atomized catalyst;

introducing the heated air adjacent the material;

drawing the heated air through the material to convectively heat the material;

passing the heated air through a flow regulating device after the heated air has been drawn through the material to maintain the homogeneity of the heated air; and recirculating at least a portion of the heated air back to the fluid distribution system.

21. The method of claim 20 wherein homogenizing the heated air comprises passing the heated air through multiple baffles, each of the baffles having a plurality of perforations, wherein the perforations of adjacent baffles are offset with respect to each other.

22. The method of claim 21 wherein the flow regulating device includes multiple meshes, each of the meshes having a plurality of openings, wherein the openings of adjacent meshes are offset with respect to each other.

23. The method of claim 22 wherein homogenizing the heated air further comprises passing the heated air through multiple meshes, each of the meshes having a plurality of openings, wherein the openings of adjacent meshes are offset with respect to each other.

24. The method of claim 23 wherein supplying pressurized heated air to a fluid distribution system comprises supplying the heated air to first and second manifolds, each of the manifolds having an inlet for receiving the heated air and a plurality of outlet orifices for, passing the heated air out of the respective manifold, the manifolds being configured such that the outlet orifices of each manifold are respectively disposed progressively remote from the inlet of the respective manifold so that a respectively more remote orifice of one manifold opposes respectively a less remote orifice of the other manifold for mixing the heated air passing out of the manifolds.

* * * * *

UNITED STATES PATENT AND TRADEMARK OFFICE
CERTIFICATE OF CORRECTION

PATENT NO : 6,036,896
DATED : March 14, 2000
INVENTOR(S) : Sunil K. Gupté

It is certified that error appears in the above-identified patent and that said Letters Patent is hereby corrected as shown below:

Column 5, line 49, delete "claimed" and insert --described--.

Column 6, Claim 5, line 11, delete "fluid" and insert --flow--.

Column 6, Claim 13, line 32, delete "fluid" and insert --flow--.

Signed and Sealed this

Twenty-seventh Day of February, 2001

Attest:

NICHOLAS P. GODICI

Attesting Officer    Acting Director of the United States Patent and Trademark Office